(12) United States Patent
Holland

(10) Patent No.: US 12,234,890 B2
(45) Date of Patent: Feb. 25, 2025

(54) DRIVE AND/OR ADJUSTMENT DEVICE HAVING OVERLOAD PROTECTION

(71) Applicant: Liebherr-Components Biberach GmbH, Biberach an der Riss (DE)

(72) Inventor: Maximilian Holland, Biberach (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 18/513,415

(22) Filed: Nov. 17, 2023

(65) Prior Publication Data

US 2024/0093761 A1  Mar. 21, 2024

Related U.S. Application Data

(63) Continuation of application No. PCT/EP2022/063129, filed on May 16, 2022.

(30) Foreign Application Priority Data

May 20, 2021  (DE) .......................... 102021113127.8

(51) Int. Cl.
*F16H 1/46* (2006.01)
*F16H 48/11* (2012.01)
*F16H 57/08* (2006.01)

(52) U.S. Cl.
CPC ............... *F16H 1/46* (2013.01); *F16H 48/11* (2013.01); *F16H 57/082* (2013.01); *F16H 2057/085* (2013.01)

(58) Field of Classification Search
CPC .......... F16H 1/46; F16H 48/11; F16H 57/082; F16H 2057/085; F16H 35/10; F16B 31/04; F16D 9/04; F16D 7/044
See application file for complete search history.

(56) References Cited

U.S. PATENT DOCUMENTS

| 4,528,470 A | 7/1985 | Young et al. |
| 2003/0160456 A1* | 8/2003 | Wobben ................. F03D 80/00 290/44 |
| 2011/0027006 A1 | 2/2011 | Hausladen et al. |

(Continued)

FOREIGN PATENT DOCUMENTS

| DE | 3512800 | 10/1985 |
| DE | 3323251 C2 | 9/1990 |

(Continued)

*Primary Examiner* — Jacob S. Scott
*Assistant Examiner* — Farhana Pervin
(74) *Attorney, Agent, or Firm* — Levine Bagade Han LLP

(57) ABSTRACT

The present invention relates to a drive and/or adjustment device for driving and/or adjusting a rotatable assembly, for example a large rolling bearing ring of a wind turbine or a slewing gear of a construction machine or of a hoist, comprising an output element for rotationally driving and/or adjusting the rotatable assembly, a transmission which is connected upstream of the output element and has at least one torque-transmitting gear, and an overload safety mechanism for the rotatable assembly. The overload safety mechanism is provided on the gear, which is divided and has two gear parts that are torque-transmittingly interconnected via spur toothing and held axially in spur toothing engagement by an axial securing means which yields at a predetermined axial loading between the gear parts.

20 Claims, 4 Drawing Sheets

(56) References Cited

U.S. PATENT DOCUMENTS

| | | | |
|---|---|---|---|
| 2011/0286846 A1* | 11/2011 | Shoda | F03D 15/10 |
| | | | 475/335 |
| 2019/0032771 A1* | 1/2019 | Muench | F16C 19/364 |
| 2019/0136948 A1* | 5/2019 | Palvoelgyi | F16D 7/044 |
| 2019/0186467 A1* | 6/2019 | Eusterbarkey | F03D 15/00 |
| 2020/0191207 A1* | 6/2020 | Kawashita | F16D 1/076 |
| 2022/0136586 A1* | 5/2022 | Spruce | F16H 57/08 |
| | | | 475/340 |

FOREIGN PATENT DOCUMENTS

| | | |
|---|---|---|
| DE | 102009035197 | 2/2011 |
| DE | 102020124855 | 3/2022 |
| EP | 1561970 A2 | 8/2005 |
| EP | 3483477 | 5/2019 |
| WO | WO 2008/019931 | 2/2008 |
| WO | WO 2017/084755 | 5/2017 |
| WO | WO 2022/243217 | 11/2022 |

\* cited by examiner

DRIVE AND/OR ADJUSTMENT DEVICE HAVING OVERLOAD PROTECTION

CROSS-REFERENCE TO RELATED APPLICATIONS

This application is a continuation of International Patent Application Number PCT/EP2022/063129 filed May 16, 2022, which claims priority to German Patent Application Number DE 102021113127.8 filed May 20, 2021, which are incorporated herein by reference in their entireties.

BACKGROUND

The present invention relates to a drive and/or adjustment device for driving and/or adjusting a rotatable assembly, in particular a toothed large rolling bearing ring of a wind turbine, a cable winch or a slewing gear of a construction machine, having an output element for rotationally driving the rotatable assembly, a transmission which is connected upstream of the output element and has at least one gear transmitting torque, and overload protection for the rotatable assembly.

In case of large slewing gears or control elements that are subject to large external loads, as is the case, for example, with the nacelle or blade pitch drives of wind turbines or the slewing gear of a crane such as a derrick crane or also with strong cable winches, gear rims are usually fitted to the assemblies to be rotated, which can be rotationally driven or adjusted by a drive pinion meshing with them, which forms the output element of a drive train. An electric or hydraulic motor can be used as the drive, which drives said output element and thus said gear rim via a transmission. The gear rim can be attached to the inner or outer circumference of a rolling bearing ring, which can be connected to the assembly to be rotated, such as the nacelle of a wind turbine or the rotating platform of a crane, and forms part of a rolling bearing with which the assembly is rotatably mounted. Such toothed rolling bearings often form large rolling bearings with diameters of more than half a meter or even several meters in order to support the high weight and bearing forces of the assembly to be rotated.

In order to prevent damage to the teeth on the gear rim or even on the large rolling bearing ring in overload situations, the drive and/or adjustment device often has overload protection which prevents the transmission of excessive torques or forces to the component to be rotated and in particular the gear rim on the rolling bearing ring. Such overload protection often provides for a predetermined breaking point on a drive train component that does not cause any major damage and, above all, is easier to replace than, for example, the toothed bearing ring of a large rolling bearing. The latter can hardly be replaced, as this would require dismantling the often massive, heavy assembly such as the slewing platform with the entire superstructure of a crane or the nacelle with the entire rotor of a wind turbine.

Such a predetermined breaking point may be provided, for example, in the output shaft that drives the pinion meshing with the gear rim, wherein the output shaft may be weakened in diameter at a point such that it will withstand the operating load but will break statically at a predetermined overload.

Such an overload protection in the form of a predetermined breaking point by weakening the output shaft of a slewing gear drive is shown, for example, in the patent document US 2011/0027006 A.

To adjust the predetermined breaking load or the predetermined breaking torque, the diameter can essentially be changed on the output shaft or the size of the diameter weakening can be adjusted, or the material of the output shaft can be adjusted accordingly. However, both can only be changed to a limited extent or even freely selected, since the available installation space is very limited depending on the application and the output shaft and output shaft housing are often customer-specific components which are individually adjusted to the respective application, so that a specific solution must be found separately for each application. In addition, the overload protection is difficult to retrofit because the installation environment is predefined and, in this respect, the variation options for modifications to the output shaft are limited.

In addition, a predetermined breaking point in the output shaft in a rotary actuator means that the output shaft and the output shaft housing must be modified per se, since the transmission usually becomes longer due to the diameter taper or the predetermined breaking point. In addition, it is usually necessary to insert a spacer. Overall, the complexity of the parts to be changed is very high, so that the required modification of the raw parts and the costs required for this are very high in relation to a small series.

Another problem arises from the load case. Output shafts provided with a predetermined breaking point in the form of a taper can in themselves be used in a wide load range in terms of fatigue load and static load under pulsating load. Under alternating loads, however, the range is severely limited, as the predetermined breaking point becomes very thick at high fatigue. This results in the predetermined breaking point not failing when the static load is low, otherwise fatigue cannot be sustained.

Against this background, it is the object of the present invention to provide an improved drive and/or actuating device of said type which avoids the disadvantages of the prior art and further develops the latter in an advantageous manner. In particular, an improved overload protection is to be created, which reliably protects the assembly to be rotated or structural parts that are difficult to replace, both under threshold and alternating loads, and which can be easily adapted to different application and load cases.

SUMMARY

Said task is solved, according to the invention, with a drive and/or actuating device as claimed in claim 1. Preferred embodiments of the invention are the subject of the dependent claims.

It is thus proposed to provide the overload protection on a gear of the transmission, which is connected upstream of the output element of the drive train and drives or adjusts the assembly to be rotated via said output element. The gear is configured in such a way that it interrupts the drive train in the event of an overload and ceases to transmit drive torque. According to the invention, the gear is configured to be split and has two parts that are torque-transmittingly connected to each other by a spur toothing engagement and axially retained in spur toothing engagement by an axial securing means that yields when a predetermined axial load is applied between the gear parts. If the axial securing means yields under an excessive axial load, the gear parts can move axially away from each other so that the spur toothing engagement between the gear parts is disengaged and the gear parts are rotatable relative to each other. Due to the oblique tooth flanks, the spur toothing between the gear parts generates axial forces that depend on the transmitted torque, so that an overload case is accompanied by an excessive axial force, which can then lead to the axial securing means being triggered.

By integrating the overload protection into a gear of the transmission, it is sufficient to replace only one component of the drive train and it is easy to retrofit the overload protection for existing rotary actuators. In addition, the overload protection can be easily adjusted to different applications and drive cases with regard to the tripping torque or tripping load. Above all, a defined triggering of the overload protection can be achieved for both pulsating and alternating loads without major differences between the load cases, since the axial securing means is largely only exposed to pulsating tensile loads. The spur toothing engagement between the two gear parts generates only threshold tensile loads on the axial securing means, even with changing directions of rotation or changing loads, so that there are advantages compared with conventional predetermined breaking points in the output shaft, particularly in the case of changing loads.

It is particularly advantageous if the overload protection is integrated in the sun gear of a planetary gear via which the output element of the drive and/or adjustment device and thus the assembly to be rotated is driven or adjusted. In particular, the sun gear of the planetary gear can be configured to be split in said manner and have two sun gear parts that are torque-transmittingly connected via spur toothing and axially held together by the axial securing means in spur toothing engagement and thus rotationally restrained until said axial securing means yields and the sun gear parts can axially yield and move out of spur toothing engagement.

The sun gear of an output stage can usually be the same for different rotary actuators of one size, so that two blanks per series size are sufficient. At the same time, the length of the sun gear can be maintained compared to a conventional, undivided sun, so that further adjustments to the installation environment, such as a reshaping of the gearbox housing, can be avoided. Nevertheless, there are many adjustment or adaptation options for controlling the triggering of the overload protection, for example by changing the gear geometry in terms of pressure angle and/or tooth length and/or tooth direction and/or number of teeth, or by configuring the axial securing means.

Said axial securing means can be configured in a simple manner to be rigid and hold the two gear parts together in an inherently immovable and rigid manner until they are released in the event of an overload. Since the torque itself is only transmitted via the spur toothing engagement, the axial securing means is only subject to a tensile load, so that the axial securing means does not have to bear any bending moments and is not subject to permissible movements.

In particular, the axial securing means can form a predetermined breaking point between the two gear parts. If the axial securing means breaks at a predetermined overload, the two gear parts can move axially, i.e. along the axis of rotation of the gear relative to each other, and move away from each other to disengage the spur toothing engagement, which then allows the gear parts to rotate relative to each other and interrupts the drive train.

In principle, it would be possible to configure the axial securing means to be elastic or yielding, so that when a predetermined axial load is reached between the gear parts, it yields, e.g. elongates, to release the spur toothing engagement and allow the gear parts to rotate relative to each other. However, this would result in slippage of the gear distribution with a corresponding chattering of the teeth, which would lead to corresponding damage to the spur toothing of the gear parts. In this respect, it can be more cost-effective to configure the axial securing means as a predetermined breaking point and to replace it after breakage, since the undamaged gear parts can then be reused.

In an advantageous further development of the invention, the axial securing means can have one or more tension bolts, for example in the form of one or more screws, which hold the two gear parts against each other in spur toothing engagement and serve as a predetermined breaking point if, in the event of an overload, the spur toothing causes an excessive axial load on the tension bolts or screws.

Advantageously, each of the two parts of the gear can have circumferential toothing through which the gear parts are in rolling or comb engagement with upstream and downstream gear elements of the drive train in a torque-transmitting manner. In this case, the gear parts have toothing on the peripheral side on the one hand and toothing on the end face on the other, via which the drive or adjustment torques or forces of the drive train are transmitted. If axial securing means is triggered and the spur toothing between the gear parts disengages, each gear part or gear half can remain in mesh with the upstream or downstream gear element of the drive train via its circumferential toothing and remain engaged. Nevertheless, there is no drive or actuating movement transmitted any more.

At least one of the gear parts—if the axial securing means is disregarded or the triggered case is assumed—can be mounted so that axial movement is permissible. It may be permissible if the bearing arrangement of at least one gear part has sufficient axial play which is sufficiently large to allow the spur toothing to disengage. The gear parts are held together axially only by the axial securing means and the bearing arrangement of the gear parts is such that, in the event of breakage or release of the axial securing means, the gear parts can move apart axially to such an extent that the spur toothing disengages.

Said spur toothing can be configured in different ways. In an advantageous further development of the invention, on the gear halves or gear parts provision can be made for a Hirth joint. However, other types of spur toothing can also be provided, wherein the spur toothing of the gear parts preferably do not have an axial restraint that would hold the gear parts together if the axial securing means were to break. In particular, the teeth of the spur toothing can be configured in terms of pressure angle and/or tooth length and/or tooth direction and/or tooth flank contour and/or number of teeth in such a way that, at a predetermined torque between the gear parts, a sufficiently large axial force is generated between the gear parts to drive the gear parts apart and thus release the spur toothing engagement when the axial securing means is broken or has been triggered.

In order to avoid damage to the gear parts or other gear elements by broken axial securing means, a catching means for broken axial securing means can be provided in an advantageous further development of the invention. In particular, such catching means can hold or catch broken pieces of the tension bolts or screws in or on the gear part to which the bolt or screw piece was mounted in unbroken condition. For example, the bolts or screws on both gear parts can be secured so that even in a broken state the bolt pieces or screw pieces remain held in their intended assembly position. For example, the bolts or screws can be recessed or at least flush mounted with their heads or nuts and secured to the gear part by a cover, retaining clip or the like in case of breakage.

After the overload safety mechanism has been triggered by breakage of the axial securing means or of at least one tension and/or screw bolts, the broken axial securing means can be removed and replaced by a new, intact axial securing means so that the split gears can be used again. All that is required is to bring the two gear parts back into spur toothing engagement and, depending on the configuration of the axial securing means, to insert one or more new screw bolts and/or tension bolts to hold the two gear parts together again.

If the overload protection is integrated in the sun gear of a planetary gear stage in the way already said, the sun gear can be connected to the planet carrier of the upstream or downstream gear stage by a sun gear part via meshing toothing. Alternatively, or in addition thereto, the other sun gear half may form the actual sun or have meshing toothing by which said sun gear half meshes with the planets of the planetary stage.

BRIEF DESCRIPTION OF THE DRAWINGS

The invention is explained in more detail below with reference to a preferred embodiment and associated drawings. The drawings show.

DETAILED DESCRIPTION

Figure 1:
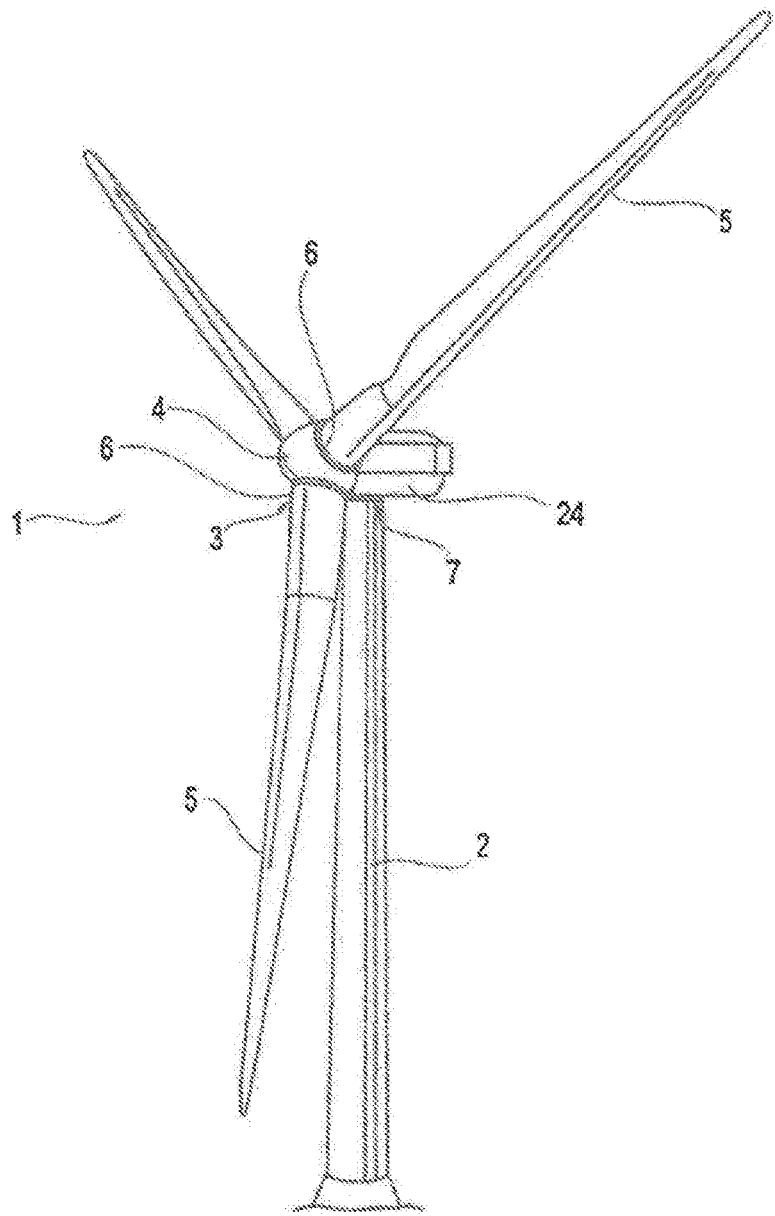
FIG. 1: a perspective view of a wind turbine, the nacelle of which is rotationally drivably mounted via a large rolling bearing with a gear rim.

As shown in FIG. 1, the drive and/or adjustment device can be used in a wind turbine 1 to rotate its nacelle 24 about an upright axis or to adjust its azimuth angle. On the nacelle 24 or a machine casing, the rotor 3 can be rotatably mounted about a horizontal rotor axis, wherein said nacelle 24 itself can be rotatably mounted on a tower 2 about an upright axis by means of a large rolling bearing.

Rotor blades 5 can be mounted on the rotor hub 4 to rotate about longitudinal rotor blade axes, the pitch angle of which can be adjusted by means of a drive and/or adjustment device. Similarly, said nacelle 24 may be rotated by a drive and/or adjustment device.

Figure 2:
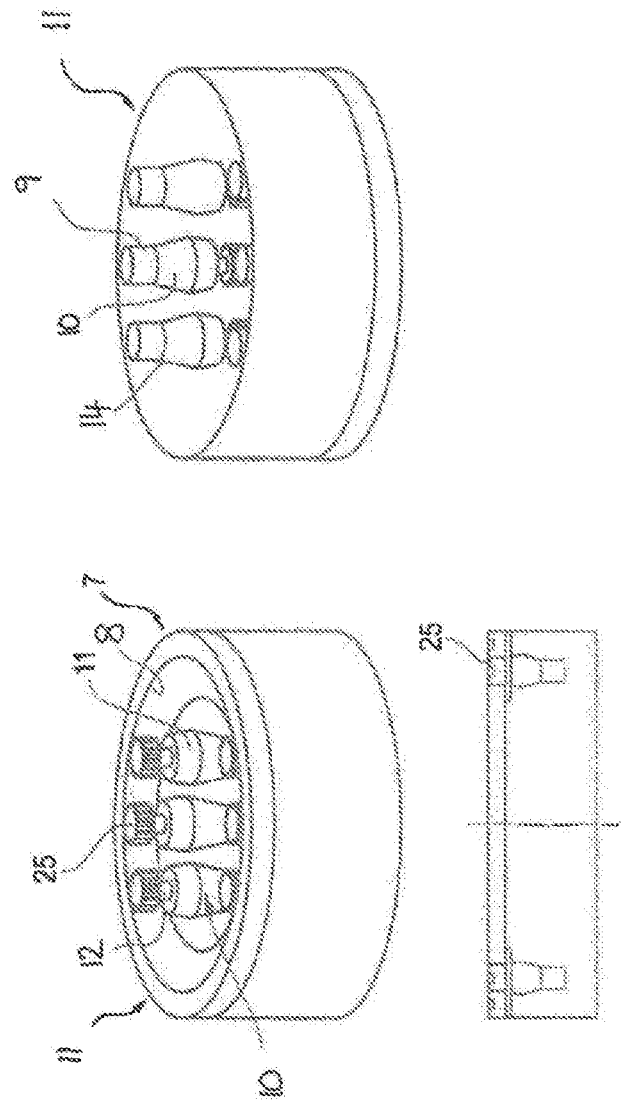
FIG. 2: a perspective view of the drive and/or adjustment device for rotationally driving or adjusting the large rolling bearing comprising the gear rim, with which the nacelle of the wind turbine of FIG. 1 can be supported.

As shown in FIG. 2, said azimuth bearing 7—and similarly the pitch bearing 6—may be configured in the form of a large rolling bearing having two bearing rings rotatable relative to each other, one of which may be provided on the inner circumference or on the outer circumference with teeth in the form of a gear rim 8. In order to be able to rotationally adjust the component to be rotated in the form of the gear rim 8 or the bearing ring connected thereto, a drive and/or adjustment device 11 is provided, which can comprise a pinion as output element 25, which meshes with the gear rim 8 in order to rotationally drive the latter.

As shown in FIG. 2, several drive and/or adjustment devices 11 can be provided to jointly drive or adjust the component to be rotated.

Said drive and/or adjustment device 11 can have a drive motor 9, for example in the form of an electric motor or a hydraulic motor, the rotationally driven movement of which drives an output shaft 12 via a transmission 10, on which the output element 25 in the form of the pinion is seated.

Said transmission 10 may be configured, in particular, as a single-stage or multi-stage planetary transmission in which a sun gear 13 meshes with planetary gears rotatably arranged on a planet carrier about the sun gear 13. Depending on the design of the planetary gear unit, the planet carrier can be fixed or rotatably mounted.

In a manner known per se, said planetary gears can mesh with a ring gear which is arranged around the planets and can be fixed to the gear housing 14 or, depending on the design of the planetary gear, can also be rotatably mounted.

Figure 3:
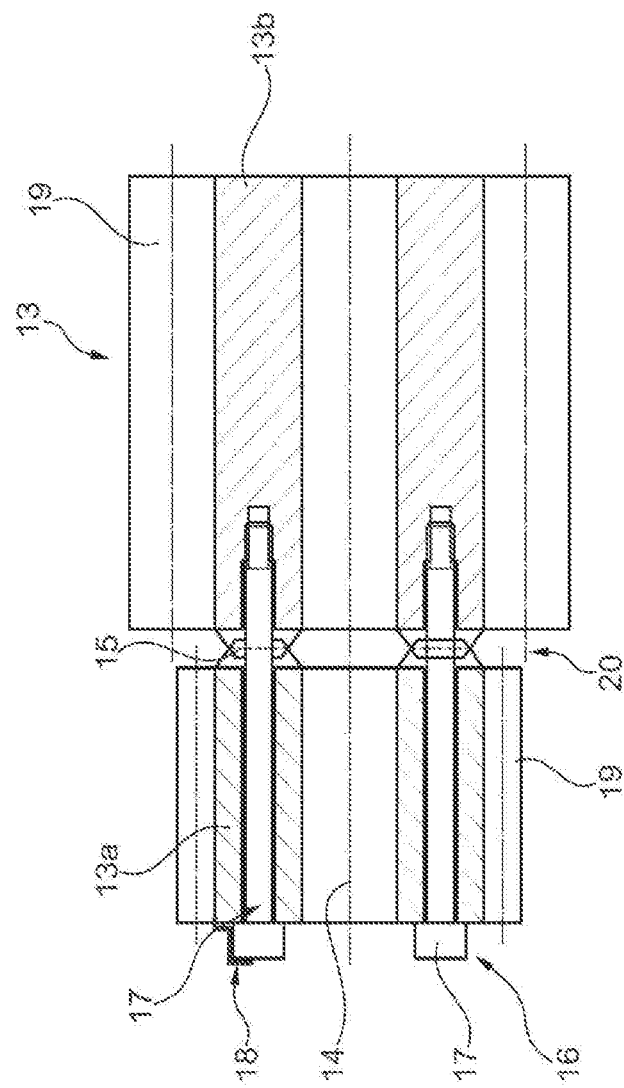
FIG. 3: a sectional view of the sun gear of a planetary gear stage of the drive and/or adjustment device of the foregoing figures, showing the split configuration of the sun gear as overload protection.

As shown in FIG. 3, an overload safety mechanism 20 is provided on the sun gear 13 to prevent damage to the gear rim 8 of the component to be rotated or even damage to the component to be rotated itself, for example to the bearing ring of the azimuth bearing 7, in the event of an overload. Said overload safety mechanism 20 interrupts the power or torque flow at the sun gear 13 and disconnects the drive train so that no torque or drive movement is transmitted at the sun gear 13 from the drive motor 9 to the output element 25 and, conversely, no reaction forces or torques are transmitted from the output element 25 to the drive motor 9.

As shown in FIG. 3, the sun gear 13 is configured as split and comprises two gear parts or halves 13a and 13b which, in normal operation, are rotationally connected by the overload safety mechanism 20. The two gear parts 13a and 13b can be separated from each other or in contact with each other and connected by a parting plane perpendicular to the axis of rotation 14 of the sun gear 13. In particular, the two gear parts 13a and 13b facing each other may contact each other and be connected to each other. In order to be able to transmit torques in normal operation, the two gear parts 13a and 13b are engaged and rotationally locked together by means of a spur toothing 15. The spur toothing 15 can have meshable toothing rings or segments or rows provided on the end faces of the sun gear parts 13a and 13b.

Said spur toothing 15 is advantageously not configured to be self-locking or configured such that no axial inhibition occurs to allow the gear parts 13a and 13b to be axially separated and the spur toothing engagement to be released when the overload safety mechanism 20 is triggered and the two gear parts 13a and 13b are axially released from each other.

To avoid such axial inhibition, for example, the angles of the tooth surfaces of the spur toothing 15 can be sufficiently large. Alternatively, or additionally, however, axial inhibition can also be avoided by other gear parameters, for example the pressure angle, the tooth length, the tooth direction or the number of teeth of the spur gear segments.

For example, said spur toothing 15 can be configured as so-called Hirt spur toothing.

In order to keep the spur toothing 15 engaged during normal operation and to rotationally lock the gear parts 13a and 13b together, the overload safety mechanism 20 comprises an axial securing means 16 which holds the two gear parts 13a and 13b axially on top of each other in spur toothing engagement and can be configured as a predetermined breaking point to be triggered when a predetermined torque between the two gear parts 13a and 13b is exceeded and thus a predetermined axial force generated via the tooth geometry is exceeded.

Advantageously, said axial securing means 16 can comprise one or more tension bolts 17, for example in the form of screw bolts, which can be arranged distributed around the axis of rotation 14, for example, and hold the two gear parts 13a and 13b axially on top of each other, see FIG. 3.

Figure 4:
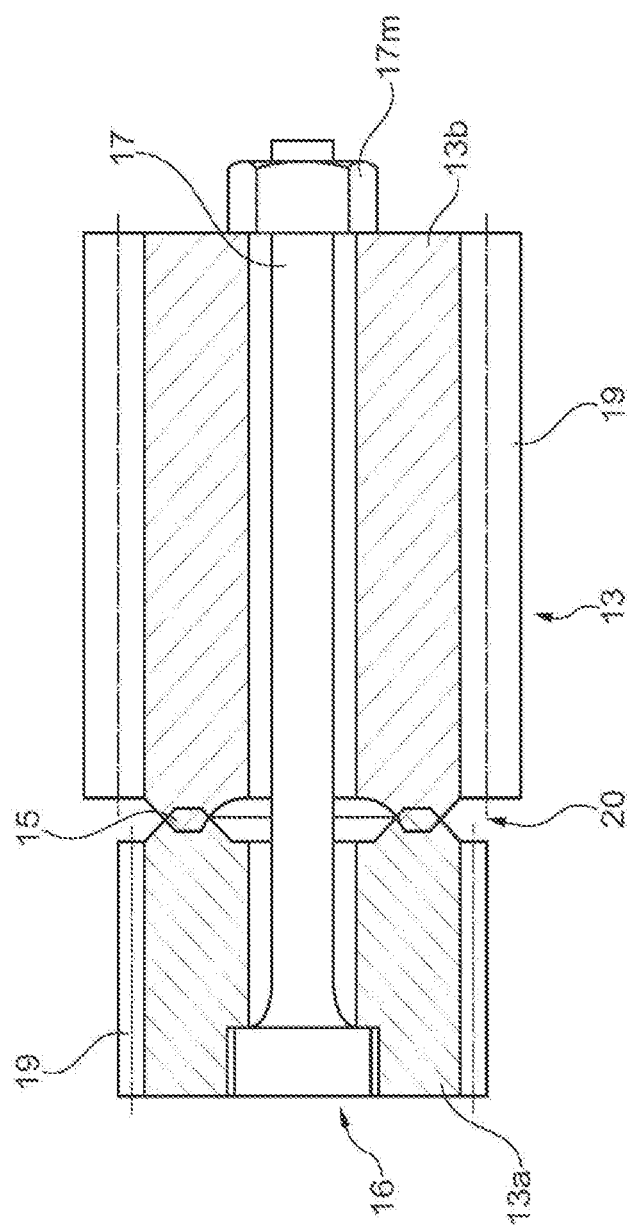
FIG. 4: a sectional view of a sun gear similar to FIG. 3, wherein the two parts of the sun gear are held in spur toothing engagement by a central screw bolt rather than by a plurality of screw bolts and/or tension bolts.

As shown in FIG. 4, however, the two gear parts 13a and 13b can also be held axially on one another by only one tension bolt 17, for example in the form of a screw bolt, wherein when only one tension bolt 17 is used, the latter can advantageously be arranged centrally or coaxially to the axis of rotation, cf. FIG. 4. Such a central spur toothing 17 advantageously does not pass through the spur toothing 15, but is surrounded by said spur toothing 15, which may be radially spaced from the spur toothing 17, see FIG. 4.

The torque between the gear parts 13a and 13b is advantageously transmitted by the spur toothing 15 alone, while the axial securing means 16, in particular its tension and/or screw bolts 17, are loaded alone or at least primarily in axial tension parallel to the axis of rotation 14. Said axial forces on the tension and/or screw bolts 17 are caused by the inclined tooth flanks which try to drive the gear parts 13a and 13b apart with a wedge action Said tension and/or screw bolts 17 are advantageously matched to the spur toothing 15 in such a way that a predetermined breakage and thus triggering of the overload safety mechanism 20 occurs at a predetermined torque at the gear parts 13a and 13b. More specifically, the screw or tension bolts 17 are configured to break at a predetermined axial load. In conjunction with the design of the spur toothing geometry, this allows the overload safety mechanism 20 to be triggered at a predetermined torque.

Due to the breakage of the tension and/or screw bolts 17, the axial load originating from the spur toothing 15 can no longer be transmitted and the spur toothing 15 or the gear parts 13a and 13b are driven apart axially, interrupting the drive train in the transmission 10 at the sun gear 13. As a result, the output stage or the drive and/or adjustment device is switched load-free.

This causes the transmission 10, or more precisely the sun gear 13, to fail under overload before, for example, the gear rim 8 on the large rolling bearing breaks.

In order to avoid further damage caused by broken pieces of the tension and/or screw bolts 17 on other gear elements, said tension and/or screw bolts 17 can advantageously be mounted in such a way that they remain on the gear parts 13a and 13b even after breaking. A catching means 18 can retain the broken axial securing parts on the gear parts 13a and 13b, in particular in their intended assembly position, which is also assumed in the unbroken state.

As shown in FIG. 3, for example, the screw bolts 17 may extend through one of the gear parts 13a or through recesses designed therein and be screwed into screw threads provided in the other gear part 13b, for example in the form of a blind hole thread. The bolt part screwed into the blind hole thread, which may have broken off, remains in the gear part 13b when it is screwed in. In order to retain the other broken-off bolt part in the gear part 13a as well, the catching means 18 can retain the bolt head on the end face of the gear part 13a. For example, a cover or lid may be placed over the bolts 17 or their heads, which are located on the end face of the gear part 13a.

As shown in FIG. 4, regardless of whether only one or more tension bolts 17 are provided, the axial securing means 16 can also pass through a through recess passing through both gear parts 13a, 13b and be secured by means of a nut 17m which can be supported axially on one of the gear parts 13b. Said nut 17m can be mounted projecting axially, as shown in FIG. 4, but may also be recessed in the respective gear part 13b, similar to what is shown in FIG. 4 for the head of the tension bolt 17. Sid catching means 18 may also be provided when there is used nut 17m screwed on, in which case the catching means 18 may comprise two catching means parts, one of which is associated with the head of the tension bolt and another of which is associated with said nut in order to retain the latter on the respective gear part 13a or 13b in the event of breakage.

For example, as a tension bolt 17, there can be used an expansion shaft bolt or a carbon rod.

By providing the overload safety mechanism 20 on the sun gear 13, the following advantages can be achieved in particular:—

The length of the sun gear 13 or its axial extension in the direction of the axis of rotation 14 can be maintained per se. To retrofit the overload safety mechanism 20, only one part needs to be replaced, so that existing rotary actuators can be easily retrofitted. In addition, the sun gear 13 of the output stage is the same for different rotary actuators of one series size, which means that only two new blanks need to be created for each series size.

The overload safety mechanism 20 in the form of the predetermined breaking point of the axial securing means 16 or the tension bolts 17 is also subjected to swelling tensile loads in alternating directions of rotation, so that differences in function between swelling and alternating loads are reduced and the overload safety mechanism 20 trips reliably under both swelling and alternating loads. In this respect, there are advantages in particular with regard to a load in the changing range compared with previous predetermined breaking points on the output shaft.

There are many setting and adjustment options to adjust the triggering of the overload safety mechanism to the respective application or load case. For example, the tooth form can be varied in the area of the spur toothing 15, in particular the pressure angle, the tooth length, the tooth direction and the number of teeth. On the side of the axial securing means 16, the screw or bolt shape, the number of tension and/or screw bolts 17, their material and cross-sectional dimensions can also be changed in order to be able to adjust the triggering of the overload safety mechanism 20.

An existing drive and/or adjustment device can be easily retrofitted with an overload safety mechanism 20, wherein conversion of the transmission 10 can be accomplished by replacing the gear or sun gear 13 alone, without further modification to the installation environment.

As shown in FIG. 3, the two gear parts 13a and 13b can each be provided with a meshing toothing 19 on the peripheral side in order to be in a rolling engagement with an upstream or downstream gear element and to be able to transmit a corresponding drive movement. Depending on the configuration of the transmission 10, these can be different transmission elements. For example, the gear part 13a with its meshing toothing 19 can be connected or in meshing engagement with a planet carrier of a previous planetary gear stage. The other gear half 13b can mesh with the planets of the planetary gear stage with its meshing toothing 19 and in this respect form the actual sun of the planetary gear or planetary stage.

In order to separate or interrupt the flow of force or torque after the axial securing means 16 has broken, at least one of the gear parts 13a and 13b can be mounted so that it can move axially in the direction of the axis of rotation 14, for example by means of sufficient bearing clearance or a sufficiently dimensioned clearance in the axial direction.

Advantageously, the transmission, in particular the bearing of the gear 13, can be configured in such a way that the two-piece gear 13 with the overload safety mechanism 20 can be replaced by a dimensionally identical or similar one-piece gear without overload protection, so that the transmission can be selectively operated or put into operation with the two-piece gear 13 with overload protection or with a conventional gear without overload protection. In particular, a conventional transmission without an overload safety mechanism can be easily retrofitted with an overload safety mechanism by replacing a previously one-piece sun gear with a two-piece sun gear comprising two gear parts 13*a*, 13*b* as described, which can be brought into spur toothing engagement and held in said spur toothing engagement by an axial securing means. Depending on the configuration of the conventional one-piece gear, it may be advantageous to use several off-center locking pins, as shown in FIG. 3, or to use the version with one central locking pin, as shown in FIG. 4. In particular, the gear 13 may be detachably and interchangeably mounted for selectively using one or the other variant.

I claim:

1. A drive and/or adjustment device for driving and/or adjusting a rotatable assembly comprising a large rolling bearing ring of a wind turbine or a slewing gear of a construction machine or of a hoist, comprising an output element for rotationally driving and/or adjusting the rotatable assembly, a transmission which is connected downstream of the output element and has at least one torque-transmitting gear, and an overload safety mechanism for the rotatable assembly; wherein the overload safety mechanism is on the at least one torque-transmitting gear, wherein the gear is divided and comprises two gear parts that are torque-transmittingly interconnected via spur toothing and held axially in spur toothing engagement by an axial securing means which yields at a predetermined axial loading between the gear parts, wherein the transmission comprises a planetary gear with a divided sun gear forming the overload safety mechanism.

2. The drive and/or adjustment device of claim 1, wherein the axial securing means is rigid and forms a predetermined breaking point.

3. The drive and/or adjustment device of claim 1, wherein the gear parts comprise a split gear wheel that has a meshing toothing on a peripheral side, via which the gear parts are in a rolling engagement with a downstream gear element and with an upstream gear element, wherein the meshing toothing is configured such that the gear parts are axially displaceable in a direction of an axis of rotation relative to upstream and downstream gear elements and/or the gear parts are not subject to axial forces from the upstream and downstream gear elements.

4. The drive and/or adjustment device of claim 1, wherein the spur toothing between the gear parts is configured to be axially impediment free in the engaged position during torque transmission.

5. The drive and/or adjustment device of claim 1, wherein the spur toothing between the gear parts is configured as a Hirth joint.

6. The drive and/or adjustment device of claim 1, wherein the axial securing means comprises one or more tension and/or screw bolts which is/are seated in axial recesses in both gear parts and clamp/clamps the gear parts against one another on an end face.

7. The drive and/or adjustment device of claim 6, wherein the tension and/or screw bolts extend through the spur toothing.

8. The drive and/or adjustment device of claim 6, wherein the axial securing means comprises a central tension and/or screw bolts extending coaxially with an axis of rotation of the at least one torque-transmitting gear and surrounded by the spur toothing.

9. The drive and/or adjustment device of claim 6, wherein the axial securing means extends axially through a through bore passing through both gear parts and is screwed to a nut which is axially supported on one of the gear parts.

10. The drive and/or adjustment device of claim 1, wherein the axial securing means extends completely through one of the two gear parts in an axial direction and is screwed into a blind hole in the other of the two gear parts.

11. The drive and/or adjustment device of claim 1, further comprising a catching means for retaining the axial securing means including when in a broken state on the gear parts in an intended assembly position.

12. The drive and/or adjustment device of claim 1, wherein the axial securing means is configured to be detachable from the gear parts including when in a broken state and is replaceable by a new, unbroken axial securing means, and wherein during such replacement the gear parts can be brought into an intended spur toothing engagement.

13. The drive and/or adjustment device of claim 1, wherein the axial securing means and the gear parts are configured so the gear parts exert axial forces on the axial securing means exclusively while torques between the gear parts are transmitted exclusively by the spur toothing.

14. The drive and/or adjustment device of claim 1, wherein the output element is configured as a pinion seated in a rotationally fixed manner on an output shaft of the transmission and meshes with a gear rim attached to the assembly to be rotated.

15. The drive and/or adjustment device of claim 14, wherein the output shaft is configured to be free of rated breaking points and notches.

16. A drive and/or adjustment device for driving and/or adjusting a rotatable assembly comprising a large rolling bearing ring of a wind turbine or a slewing gear of a construction machine or of a hoist, comprising an output element for rotationally driving and/or adjusting the rotatable assembly, a transmission which is connected downstream of the output element and has at least one torque-transmitting gear, and an overload safety mechanism for the rotatable assembly, wherein the overload safety mechanism is on the at least one torque-transmitting gear, wherein the gear is divided and comprises two gear parts that are torque-transmittingly interconnected via spur toothing and held axially in spur toothing engagement by an axial securing means which yields at a predetermined axial loading between the gear parts, wherein the axial securing means comprises one or more tension and/or screw bolts which is/are seated in axial recesses in both gear parts and clamp/clamps the gear parts against one another on an end face, wherein the tension and/or screw bolts extend through the spur toothing, wherein the one or more tension and/or screw bolts are parallel to an axis of rotation of the at least one torque-transmitting gear and are spaced from the axis of rotation.

17. The drive and/or adjustment device of claim 16, wherein the transmission comprises a planetary gear with a divided sun gear forming the overload safety mechanism.

18. The drive and/or adjustment device of claim 17, wherein the sun gear meshes with planet gears of a first planetary gear stage and with a planet carrier of a second, upstream or downstream planetary gear stage.

19. A drive and/or adjustment device for driving and/or adjusting a rotatable assembly comprising a large rolling bearing ring of a wind turbine or a slewing gear of a construction machine or of a hoist, comprising an output element for rotationally driving and/or adjusting the rotatable assembly, a transmission which is connected downstream of the output element and has at least one torque-transmitting gear, and an overload safety mechanism for the rotatable assembly, wherein the overload safety mechanism is on the at least one torque-transmitting gear, wherein the gear is divided and comprises two gear parts that are torque-transmittingly interconnected via spur toothing and held axially in spur toothing engagement by an axial securing means which yields at a predetermined axial loading between the gear parts, wherein the transmission is connected on an input side to a drive motor comprising an electric motor or hydraulic motor, wherein a rotational drive movement is transmitted via the transmission to the output element arranged coaxially with the motor shaft of the drive motor.

20. A drive and/or adjustment device for driving and/or adjusting a rotatable assembly comprising a large rolling bearing ring of a wind turbine or a slewing gear of a construction machine or of a hoist, comprising an output element for rotationally driving and/or adjusting the rotatable assembly, a transmission which is connected downstream of the output element and has at least one torque-transmitting gear, and an overload safety mechanism for the rotatable assembly, wherein the overload safety mechanism is on the at least one torque-transmitting gear, wherein the gear is divided and comprises two gear parts that are torque-transmittingly interconnected via spur toothing and held axially in spur toothing engagement by an axial securing means which yields at a predetermined axial loading between the gear parts, wherein the at least one torque-transmitting gear having the overload safety mechanism is replaceably mounted in the transmission and is configured to be replaced by a dimensionally identical or matching gear without the overload safety mechanism, so that the transmission can be put into operation selectively with the at least one torque-transmitting gear with the overload safety mechanism or the at least one torque-transmitting gear without overload safety mechanism.

* * * * *